United States Patent [19]

Reagan

[11] Patent Number: 5,033,705

[45] Date of Patent: Jul. 23, 1991

[54] CAMERA SUPPORT APPARATUS WITH MULTI ARM MOTION

[76] Inventor: William J. Reagan, 7309 Kentland Ave., West Hills, Calif. 91307

[21] Appl. No.: 471,630

[22] Filed: Jan. 29, 1990

[51] Int. Cl.[5] .................. F16M 3/00

[52] U.S. Cl. .................. 248/123.1; 248/292.1; 182/2; 212/195

[58] Field of Search .................. 248/123.1, 292.1; 182/2; 354/81, 293; 352/243; 212/195, 196, 256, 265

[56] References Cited

U.S. PATENT DOCUMENTS

| | | | |
|---|---|---|---|
| 2,073,998 | 3/1937 | Raby . | |
| 2,447,667 | 8/1948 | Raby . | |
| 2,616,768 | 11/1952 | Stemm | 182/2 |
| 2,719,471 | 10/1955 | Aspden et al. . | |
| 3,073,343 | 1/1963 | Mowell et al. . | |
| 3,103,257 | 9/1963 | Richards | 182/2 |
| 3,108,656 | 10/1963 | Asplundh . | |
| 3,362,432 | 1/1968 | Jameson . | |
| 3,613,546 | 10/1971 | Richardson . | |
| 3,743,049 | 7/1973 | Levrini . | |
| 3,790,773 | 2/1974 | Sapper | 248/123.1 X |
| 3,891,301 | 6/1975 | Heller | 354/81 X |
| 4,657,220 | 4/1987 | Lindsay . | |
| 4,849,778 | 7/1989 | Samuelson | 248/292.1 X |
| 4,899,097 | 2/1990 | Chapman | 182/2 X |

*Primary Examiner*—Alvin C. Chin-Shue
*Attorney, Agent, or Firm*—William W. Haefliger

[57] ABSTRACT

A camera/device support platform with improved structure for positioning the camera/device in multiple positions and about multiple axes. The camera/device is supported and counterbalanced in such a manner so as to maintain the mounting platform in a fixed attitude that is typically parallel to the ground. The camera/device, while so supported, can be freely repositioned closer to or farther from the photographed object, in addition to swinging in a vertical arc or a horizontal arc, without the need to move the support platform.

10 Claims, 5 Drawing Sheets

CAMERA SUPPORT APPARATUS WITH MULTI ARM MOTION

BACKGROUND OF THE INVENTION

This invention relates in general to camera support mechanisms commonly known as cranes, jib arms, lift arms, and balanced arms; more particularly, it concerns a unique support apparatus to allow camera movement horizontally, up and down, and rotatably about an upright axis. While prior support devices allow the camera to be swung horizontally about a vertical axis or vertically, swinging in an arc around a horizontal axis, they do not have the ability to move the camera towards or away from the object being photographed without having to move the mount supporting the entire system. Conventional camera balancing jib arms only allow radial movement around two substantially fixed axes, and because of this, the camera cannot be provided with the lateral movement required.

The conventional jib arm has a substantially horizontal axis about which a vertically swinging arm rotates and upon which is located a camera mount. This arm is additionally supported on a base having a substantially vertical axis about which the jib arm rotatably swings in a horizontal path. The shortcomings of this two-axis type of camera support are for example a change in focus, as the camera moves either closer to or farther away from the object being photographed because of the arc through which the camera travels as it is swung either horizontally or vertically or a combination of both. Another serious disadvantage caused by the described travel arc is the change in perspective caused as the camera moves closer to or farther from the object This can only be overcome somewhat by a second person moving the entire camera support unit horizontally, while the photographing is in process. This has its own series of problems, such as needing a very smooth surface on which to roll, and the need for the help of a second person.

Performing this routine has the additional effect of degrading the quality of the image being photographed. There is need for improved apparatus overcoming these disadvantages and problems

SUMMARY OF THE INVENTION

It is a major object of the present invention to provide an apparatus for supporting a motion picture, video, television. or still photography camera, or the like in such manner as to eliminate the disadvantages referred to above.

It is another object of the present invention to provide a camera traversing structure to be used as a standalone device, or in combination with conventional camera dollies.

It is yet another object of the present invention to provide means for repositioning a motion picture, video, or television camera which does not transfer the presence of travel (floor) surface flaws to the exposed film or magnetic tape, and which negates dependence upon the condition of the floor surface.

An additional object of the present invention is to provide a camera traversing structure which eliminates need for the assistance of a second person in order to position the camera, supported on such structure, over its full range of travel Basically, the invention provides a platform support apparatus, as for a camera, and comprises:

(a) a platform and a first arm, and primary pivot means interconnecting the first arm and platform so that the first arm supports the platform to swing about a generally horizontal primary pivot axis, (b) second arm means and secondary pivot means interconnecting the first and second arms so that the second arm means supports the first arm to swing about a generally horizontally secondary pivot axis, (c) third means and tertiary pivot means interconnecting the second arm means and the third mean and so that the third means supports the second arm means to swing about a generally horizontal tertiary pivot axis, (d) counterbalance means associated with the first arm and second arm means, (e) and control means for controlling pivoting of the platform about the first axis relative to the first arm in response to relative pivoting of the first arm and second arm means about the secondary axis and in response to relative pivoting of the second arm means and third arm means about the tertiary axis, thereby to maintain the platform at selected attitude as the platform is raised and lowered, and advanced and retracted horizontally.

The second arm means may advantageously include a pair of generally parallel arms between which one end of the first arm is swingable, the one end being remote from the primary pivot means. Also, the counterbalance means typically includes first counterbalance structure at the one end of the first arm, and sized to pass between the pair of arms defined by the second arm means; and, such counterbalance means may also include second counterbalance structure at one end of the second arm means, remote from the second pivot means.

In addition, the control means may advantageously include a first sheave integral with the platform and rotatably carried by the first arm to extend about the primary axis a second sheave integral with the first arm and rotatably carried by the second arm means to extend about the secondary axis, and a first belt entraining the first and second sheaves.

In this regard, the control means may also include a third sheave or sheaves integral with the second arm means and rotatably carried by the third means, and auxiliary sheaves associated with the second sheaves, and a second belt or belts entraining the auxiliary and the third sheaves Finally, a camera may be located on the platform; and a guide handle may also be provided on the first arm means for manually moving the platform up and down, and horizontally forwardly and rearwardly. A base typically carries the third means to rotate about a vertical axis.

The resulting combination provides an apparatus which permits the repositioning of an active motion picture or television camera, variably to the left or right, variably up or down, and variably away from or towards the camera supporting structure, without the need, as in other type devices, to reposition the support pedestal or dolly. The camera can be moved through its full range of travel without any dependence upon the floor or other surface upon which the dolly is located. This feature becomes extremely important when the scene being photographed would require an artificial floor or manufactured track system to be erected in order to otherwise enable smooth camera repositioning while actively shooting a scene.

Use of the present invention structure also eliminates the need for a very smooth surface provided by the use of rails or other devices to compensate for undulating surfaces. Thus, a scene can be filmed from various lateral angles and various distances without the need to physically reposition the dolly platform.

The novel features which are believed to be characteristic of the invention, both as to its organization and to method of operation, together with further objectives and advantages thereof will be better understood from the following description considered in connection with the accompanying drawing of the presently preferred embodiments of the invention illustrated by way of example. It is to be expressly understood, however, that the drawing is for the purpose of illustration and description only, and is not intended as a definition of the limits of the invention.

DRAWING DESCRIPTION

DETAILED DESCRIPTION

Figure 1:
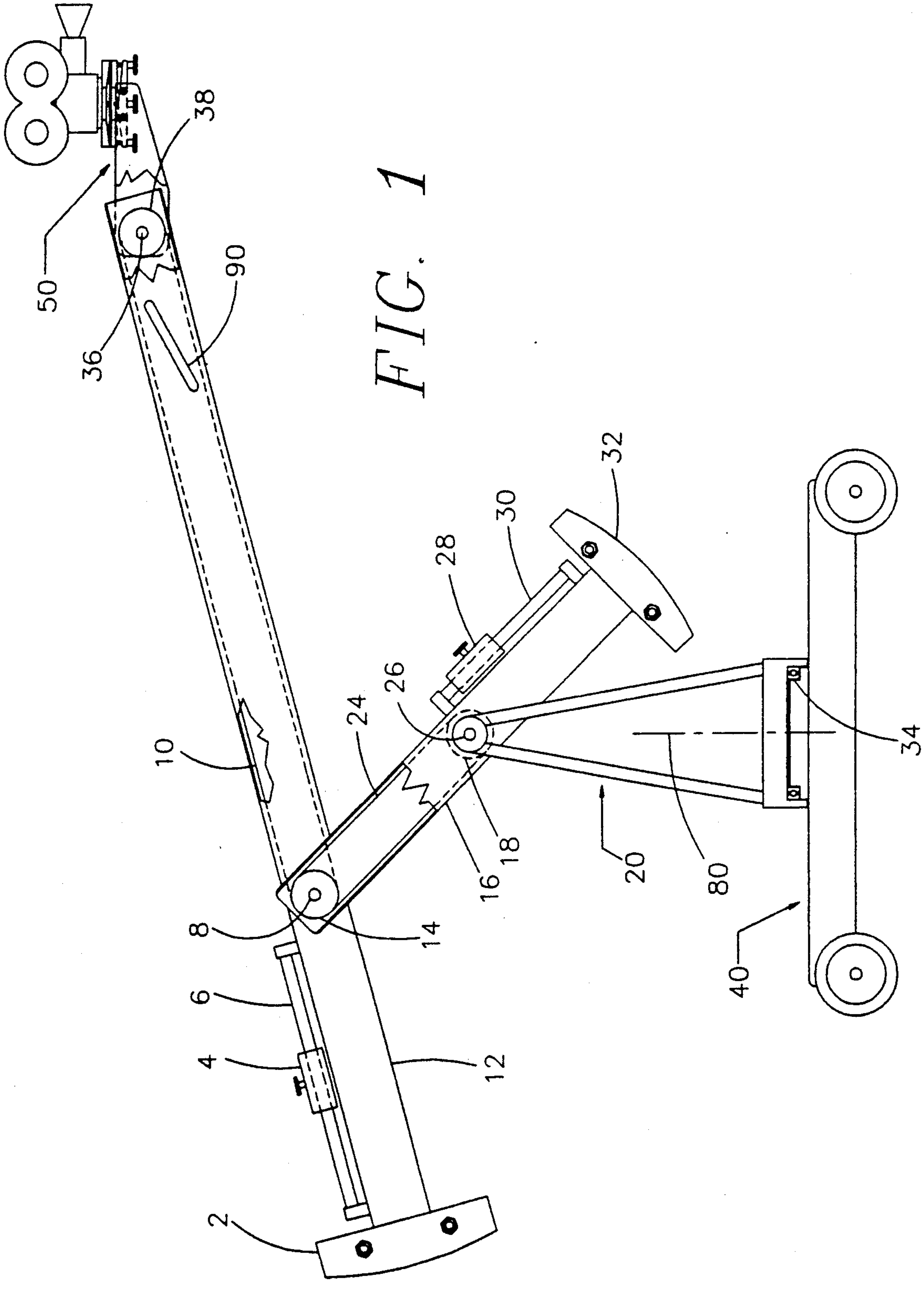
FIG. 1 is a side elevation view of a camera mounted on arm structure in accordance with the present invention.
Figure 2:
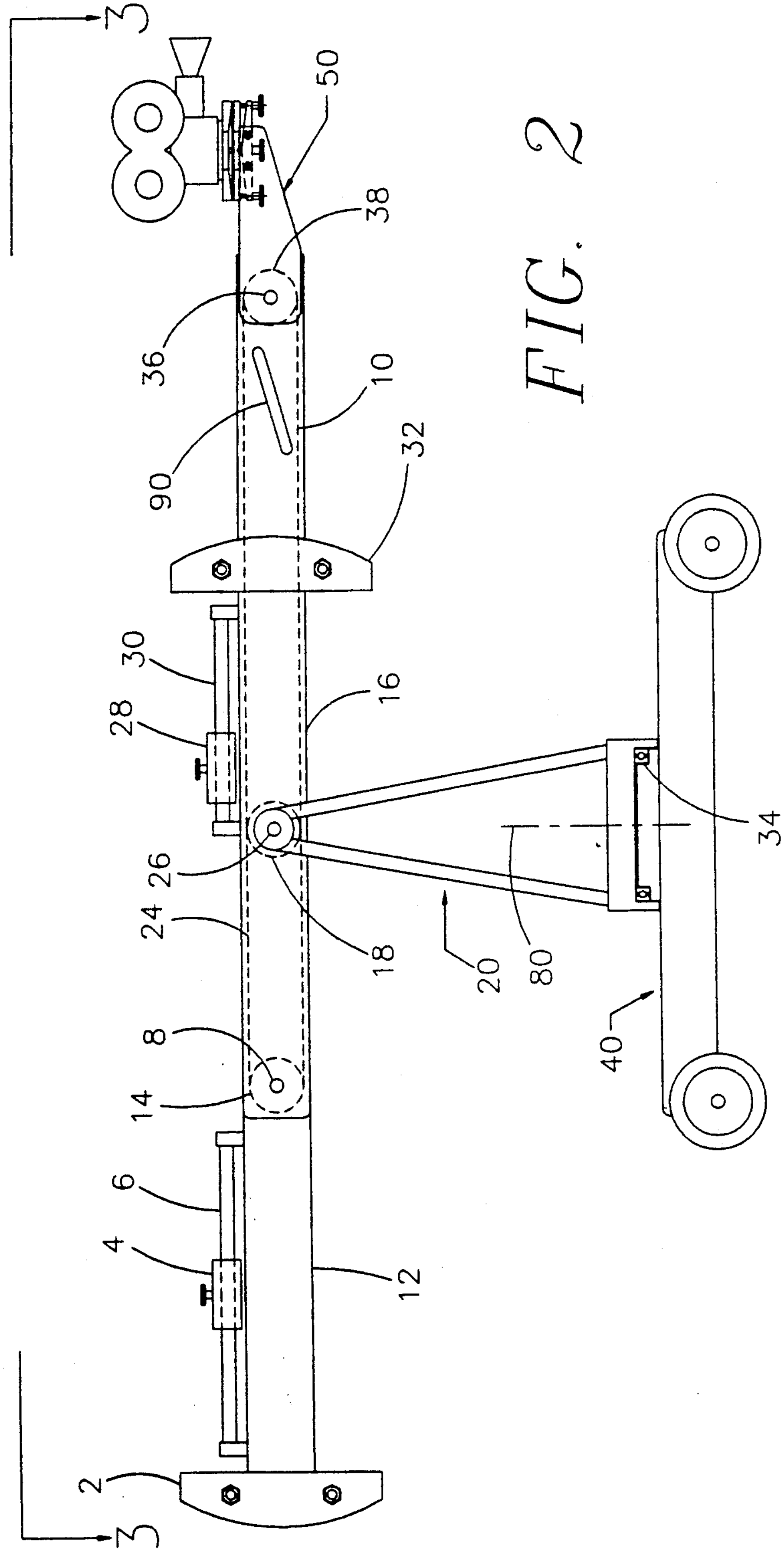
FIG. 2 is a side elevation view of the FIG. 1 arm structure in a retracted position.

For the purposes of promoting an understanding of the principles of the invention, reference will now be made to the embodiment illustrated in the drawings and specific language will be used to describe the same. It will nevertheless be understood that no limitation of the invention is thereby intended, such alterations and further modifications in the illustrated device, and such further applications of the principles of the invention, as illustrated therein, being contemplated as would normally occur to one skilled in the art to which the invention relates.

Referring to FIG. 1, there is illustrated an arm 12 rotatably mounted on the main pivot shaft 8. This arm functions as a bascule element by supporting at its distal end, platform 50. Platform 50 is substantially counterbalanced at the opposite end of arm 12, as by variously removable weights 2. Trim weight 4 is slidably positioned along rod 6 providing fine trimming of the balance of arm 12.

Figure 3:
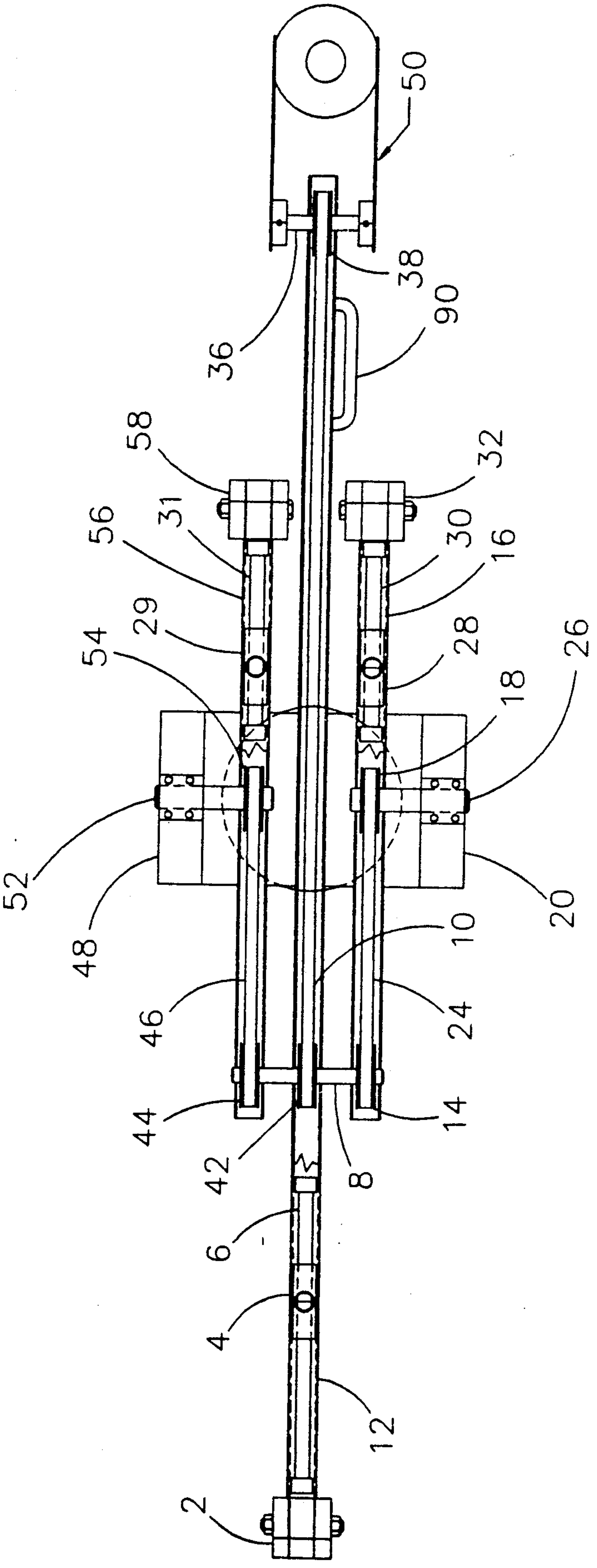
FIG. 3 is a top plan view taken on lines 3—3 of FIG. 2.
Figure 4:
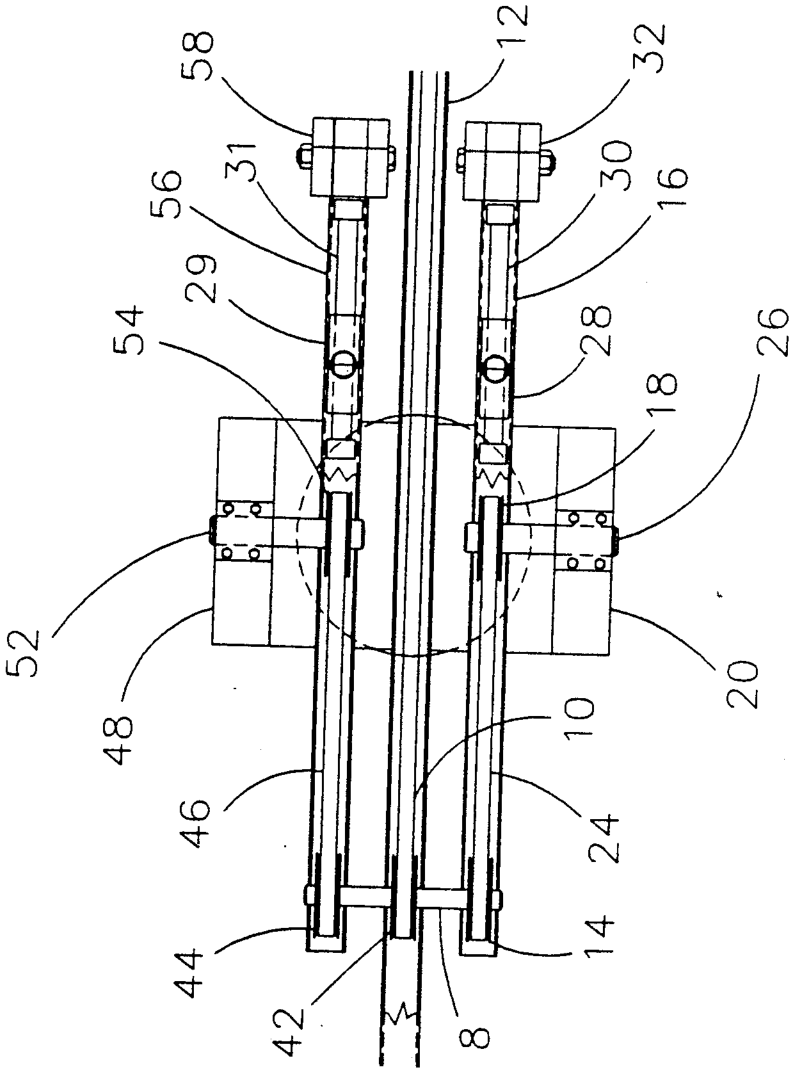
FIG. 4 is an enlarged plan view showing a central portion of the FIG. 3 apparatus.

In FIG. 3 and also FIG. 4, main pivot shaft 8, which supports arm 12, is seen to be rotatably mounted through and supported by yoke arms 16 and 56. Yoke arms are rotatably supported by coaxial yoke shafts or trunnions 26 and 52 and being so supported and designed, the yoke arms are free to rotate in a complete circle of 360 about horizontal, coaxial axes of shafts 26 and 52 parallel to the axis of shaft 8.

The parallel yoke arms 16 and 56 have rotatably mounted on their distal ends shaft 8, which rotatably supports arm 12. At the opposite end of yoke arms 16 and 56 are attached variously removable counterbalance weights 32 and 58. The final balancing of the yoke arms 16 and 56 is accomplished by the slidable positioning of trim weights 28 and 29 on rods 30 and 31, carried by one or both of 16 and 56.

In FIG. 3, shafts 26 and 52 are shown nonrotatably mounted to trunnion support blocks 20 and 48.

FIG. 1 shows blocks 20 and (48, hidden) mounted on azimuth bearing 34 which allows the arm structure to rotate about a substantially vertical axis 80 on dolly platform 40.

The details of the dolly platform are of no particular interest in this invention in that these parts may be of any suitable kind for the purpose, a number of which are now old in the art.

The top view, which is seen in FIG. 3, shows shafts 26 and 52 non-rotatably fixed to blocks or supports 20 and 48. To these shafts ar non-rotatably mounted sheaves 18 and 54. They are next linked to sheaves 14 and 44 by endless loops or belts 24 and 46. This loop, which connect the sheaves, can be any chain, band, cable, strap, or other similar device obvious to someone skilled in the art. Timing belts are particularly effective, and the cooperating sheaves may be configured as with notches to accept the belts.

It is also possible and practical to employ the use of rigid links, in place of belts; but doing so would unnecessarily restrict the function as intended. The preferred embodiment uses a cog (timing) belt, or link chain, to ensure synchronization of all of the various elements.

Continuing in FIG. 3, sheaves 14 and 44 are non-rotatably mounted to shaft 8 as shown. Because sheaves 18, 54, 14, and 44 are all of the same size, or diameter, there is a one-to-one rotary angular relationship maintained between shaft 8 and shafts 26 and 52.

Also non-rotatably mounted to shaft 8 is a sheave 42 which is connected through loop (belt) 10 to a sheave 38. Sheaves 42 and 38 have the same size or diameter; therefore, the one to one angular entry relationship is preserved. Sheave 38 is non-rotatably fixed to shaft 36, which is rotatably mounted in arm 12.

The final element is platform or camera mount 50 which is non-rotatably fixed to shaft 36.

Figure 5:
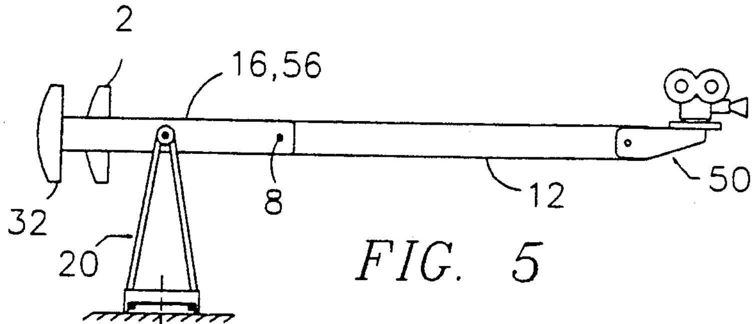
FIGS. 5-8 are schematic views showing different positions of the apparatus of the invention.
Figure 6:
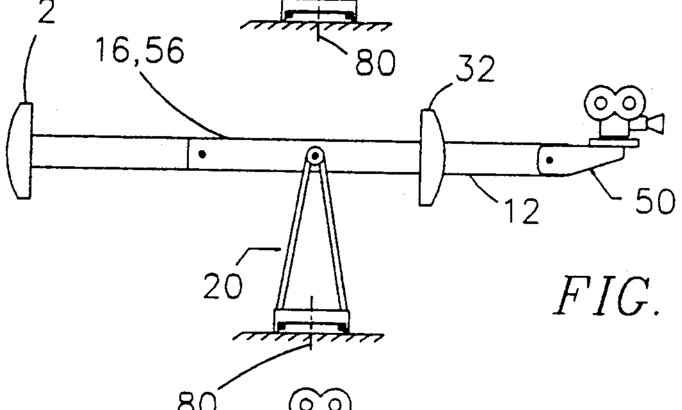
Figure 7:
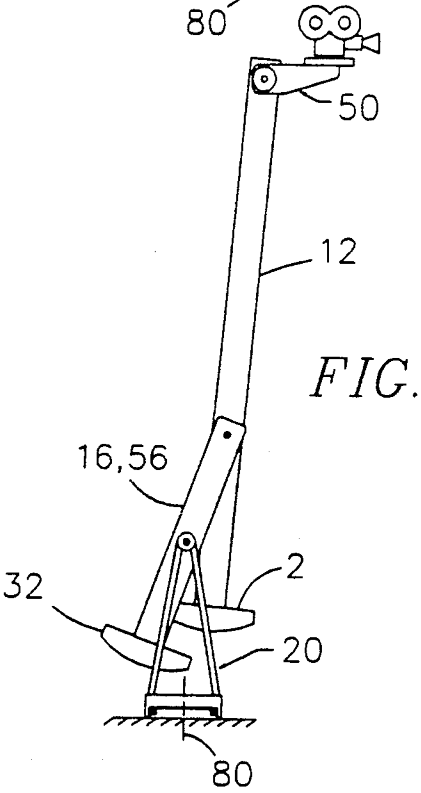
Figure 8:
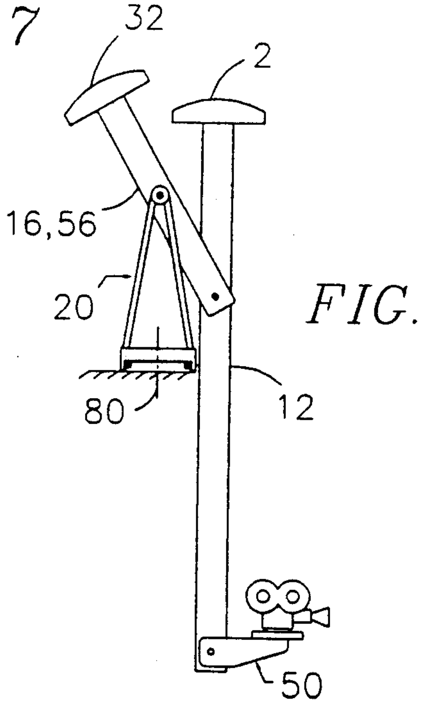

Therefore, the top surface of the platform maintains a fixed attitude regardless of the rotational attitude or position of the arm 12 or the yokes 16 and 56. Further the camera will require little effort to reposition because of the fine balancing accomplished through the manipulating of the various weights and trim adjustments. In this regard, the top surface of the platform is typically maintained horizontal. A guide handle 90 is attached to the arm 12 to enable its easy manual manipulation forward and rearwardly (see FIGS. 5 and 6) and up and down (see FIGS. 7 and 8); and also about axis 80.

Summarizing, the platform support apparatus comprises:

(a) a platform (as at 50 and a first arm (as at 12), and primary pivot means (as at shaft 36) interconnecting the first arm and platform so that the first arm supports the platform to swing about a generally horizontal primary pivot axis (axis of 36), (b) second arm means (as at 16 and/or 56) and secondary pivot means (as at 8) interconnecting the first and second arms so that the second arm means supports the first arm to swing about a generally horizontally secondary pivot axis (axis of 8), (c) third means (20 and/or 48) and tertiary pivot means (as at 26 and/or 52) interconnecting the second arm means and the third means so that the third means supports the second arm means to swing about a generally horizontal tertiary pivot axis (axis of 26 and/or 52), (d) counterbalance means (see 2, and 32 and/or 58 for example) associated with the first arm and second arm means, (e) and control means (sheaves and belt devices, as referred to) for controlling pivoting of the platform about the first axis relative to the first arm in response to relative pivoting of the first arm and second arm means about the secondary axis and in response to relative pivoting of the second arm means and third arm means about the tertiary axis, thereby to maintain the platform (50) at selected attitude as the platform is raised and lowered, and advanced and retracted horizontally.

As will appear, the second arm means typically includes a pair of generally parallel arms (16 and 56) between which one end (counterbalance 2 end) of the first arm is swingable, the one end being remote from the primary pivot means.

Further, the counterbalance means typically includes first counterbalance structure (as at 2) at the one end of the first arm, and sized to pass between the pair of arms defined by the second arm means. In this regard, the pair of arms are interconnected as by shaft 8 to form yoke.

The control means includes, as described above, a first sheave (38) integral with the platform (50) and rotatably carried by the first ar 12 to extend about the primary axis (axis of shaft 36), a second sheave 42 integral with the first arm 12 and rotatably carried by the second arm means (16 and 56) to extend about the secondary axis (axis of shaft 8), and a first belt (10) entraining the first and second sheaves.

The control means also includes:

a third sheave or sheaves (18 and 54) integral with the second arm means and rotatably carried by the third means, and auxiliary sheave associated with said second sheave, and a second belt or belts (24 and 46) entraining the auxiliary and the third sheaves.

Finally, the counterbalance means typically includes second counterbalance structure (as at 32 and/or 58) at one end of the second arm means, remote from the second pivot means.

I claim:

1. In a platform support, the combination comprising:

(a) a platform and a first arm, and primary pivot means interconnecting said first arm and platform so that the first arm supports the platform to swing about a generally horizontal primary pivot axis, (b) second arm means and secondary pivot means interconnecting the first arm and second arm means so that the second arm means supports the first arm to swing about a generally horizontally secondary pivot axis, (c) third means and tertiary pivot means interconnecting the second arm means and the third means so that the third means supports the second arm means to swing about a generally horizontal tertiary pivot axis, (d) counterbalance means associated with said first arm and second arm means, (e) and control means for controlling pivoting of the platform about said first axis relative to the first arm in response to relative pivoting of the first arm and second arm means about the secondary axis and in response to relative pivoting of the second arm means and third arm means about the tertiary axis, thereby to maintain the platform at selected attitude as the platform is raised and lowered, and advanced and retracted horizontally, (f) said second arm means including a pair of generally parallel second arms between which one end of the first arm is swingable and across said tertiary pivot axis, said one end being remote from said primary pivot means, (g) and control means including a first sheave integral with the platform and rotatably carried by the first arm to extend about the primary axis a second sheave integral with the first arm and rotatably carried by the second arm means to extend about the secondary axis, and a first endless loop entraining said first and second sheaves third coaxial sheaves integral with the second arm means and carried by the third arm means, and auxiliary sheaves coaxially associated with the said second sheave, and second endless loops entraining said auxiliary and said third sheaves, one of said second endless loops associated with one of said second arms and entraining one auxiliary sheave and one of the third sheaves, and the other of said second endless loops associated with the other of said second arms and entraining the other auxiliary sheave and the other of the third sheaves.

2. The combination of claim 1 in which the counterbalance means includes first counterbalance structure at said one end of the first arm, and sized to pass between said pair of arms defined by the second arm means.

3. The combination of claim 1 wherein said pair of arms are interconnected to form a yoke.

4. The combination of claim 1 wherein said loops comprise timing belts, the sheaves configured to mesh with the belts entraining them.

5. The combination of claim 1 including a camera on said platform.

6. The combination of claim 5 including a guide handle on the first arm means for manually moving the platform up and down, and horizontally forwardly and rearwardly.

7. The combination of claim 1 including a base carrying said third means to rotate about a vertical axis.

8. The combination of claim 2 wherein said counterbalance means includes second counterbalance structure at one end of the second arm means, remote from said second pivot means.

9. The combination of claim 8 including trim weight means associated with said counterbalance means.

10. In a platform support, the combination comprising (a) a platform and a first arm, and primary pivot means interconnecting said first arm and platform so that the first arm supports the platform to swing about a generally horizontal primary pivot axis, (b) second arm means and secondary pivot means interconnecting the first arm and second arm means so that the second arm means supports the first arm to swing about a generally horizontally secondary pivot axis, (c) third means and tertiary pivot means interconnecting the second arm means and the third means so that the third means supports the second arm means to swing about a generally horizontal teritary pivot axis, (d) counterbalance means associated with said first arm and second arm means, (e) and control means for controlling pivoting of the platform about said first axis relative to the first arm in response to relative pivoting of the first arm and second arm means about the secondary axis and in response to relative pivoting of the second arm means and third arm means about the tertiary axis, thereby to maintain the platform at selected attitude as the platform is raised and lowered, and advanced and retracted horizontally, (f) said second arm means having a construction characterized in that one end of the first arm is swingable adjacent thereto and across said tertiary pivot axis, said one end being remote from said primary pivot means, (g) and control means including a first sheave integral with the platform and rotatably carried by the first arm to extend about the primary axis a second sheave integral with the first arm and rotatably carried by the second arm means to extend about the secondary axis, and a first endless loop entraining said first and second sheaves third coaxial sheave means integral with the second arm means and carried by the third arm means, and auxiliary sheave means coaxially associated with the said second sheave, and second endless loop means entraining said auxiliary and said third sheave means.

* * * * *